United States Patent [19]

Schmidt et al.

[11] Patent Number: 5,358,346
[45] Date of Patent: Oct. 25, 1994

[54] PAPER-SEPARATING DEVICE FOR PREFOLDED CONTINUOUS PAPER IN A PRINTING DEVICE

[75] Inventors: Ludwig Schmidt, Munich; Peter Rumpel, Feldkirchen, both of Fed. Rep. of Germany

[73] Assignee: Siemens Nixdorf Informationssysteme AG, Fed. Rep. of Germany

[21] Appl. No.: 768,084

[22] PCT Filed: Dec. 13, 1989

[86] PCT No.: PCT/DE89/00766
§ 371 Date: Oct. 3, 1991
§ 102(e) Date: Oct. 3, 1991

[87] PCT Pub. No.: WO90/12374
PCT Pub. Date: Oct. 18, 1990

[30] Foreign Application Priority Data

Apr. 5, 1989 [DE] Fed. Rep. of Germany ....... 3911025

[51] Int. Cl.⁵ ............................................. B41J 15/04
[52] U.S. Cl. ................... 400/619; 400/613.2; 226/197; 346/136
[58] Field of Search ............ 226/91, 92, 196, 17, 226/200; 400/619, 613.2, 613.3, 625; 355/308; 346/136

[56] References Cited

U.S. PATENT DOCUMENTS

| | | | |
|---|---|---|---|
| 4,699,496 | 10/1987 | John et al. | 355/3 TR |
| 4,729,681 | 3/1988 | Moser | 400/613.2 |
| 4,860,031 | 8/1989 | Lejcek | 400/613 |

FOREIGN PATENT DOCUMENTS

| | | |
|---|---|---|
| 0127144 | 12/1984 | European Pat. Off. . |
| 0280036 | 8/1988 | European Pat. Off. . |
| 2440229 | 3/1976 | Fed. Rep. of Germany . |
| 2847583 | 5/1980 | Fed. Rep. of Germany . |
| 3406261 | 8/1985 | Fed. Rep. of Germany . |

*Primary Examiner*—David A. Wiecking
*Attorney, Agent, or Firm*—Hill, Steadman & Simpson

[57] ABSTRACT

A paper-separating device for prefolded continuous paper (12) which is drawn from a stockpile (11) a paper-transport device (44) and is fed to a printer, in particular a non-mechanical printer or photocopier includes a swivellable first deflecting element (32) is arranged between the paper-transport device (44) and the stockpile (11) and a second deflecting element (34) is arranged in stationary fashion in the swivel area of the first deflecting element (32). In a swivelled position of the first deflecting element (32), the paper web can be inserted into the paper-transport device of the printer. By swivelling the first deflecting element (32) into an operational position, the deflecting element grips the paper web (12) on one side and places it in the area of the second deflecting element (34).

1 Claim, 9 Drawing Sheets

PAPER-SEPARATING DEVICE FOR PREFOLDED CONTINUOUS PAPER IN A PRINTING DEVICE

BACKGROUND OF THE INVENTION

1. Field of the Invention

The invention relates to a paper-separating device for prefolded continuous paper which is drawn from a stockpile by a paper-transport device and is fed to a printer, such as a non-mechanical printer or photocopier.

2. Description of the Related Art

In high-speed printers, such as used for example in data systems technology, whether it be non-mechanical high-speed printers such as laser printers, photocopiers or the like, it is usual to use prefolded continuous paper, so-called continous fanfold stock as recording carrier. The paper is delivered prefolded as a stack and stored on a stacking surface of the printer. From this stacking surface it is then fed via a corresponding motor-driven feed device to the printing area of the printer. The prefolded paper has on its edge perforations which engage in the feed device of the printer.

When drawing paper from the stack, it may occur that individual layers or sheets of the paper stacked remain stuck to one another so that the paper web does not extend completely which can lead to faults in the paper-transport device.

A paper-separating device of the type mentioned at the beginning is known from DE-PS 34 06 261.

In this known paper-separating device, its rigid arrangement is disadvantageous. As a result, the feeding in and insertion of the paper is complicated because it has to be guided through narrow channels.

SUMMARY OF THE INVENTION

The object of the invention is to provide for printers of the type mentioned at the beginning a paper-separating device which is of ergonomically favorable design so that the continuous paper can easily be inserted.

This object is achieved in a paper-separating device of the type mentioned at the beginning in which the paper web is guided between the paper-transport device and the stockpile in a first deflecting direction via a first deflecting element, the deflection radius of which being dimensioned in such a way that paper layers which adhere together in an undesirable way are fanned out and that a further, second deflecting element which deflects the paper web in the first deflecting direction is arranged downstream of the first deflecting element in the direction of paper-transport, wherein the first deflecting element is arranged swivellably and the second deflecting element in stationary fashion in the swivel area of the first deflecting element, and in an insertion position assigned to the swivelled position (position A) of the first deflecting element, the paper web can be inserted into the paper-transport device and wherein, when the first deflecting element is swivelled into an operational position (position B) with the swivelled-in first deflecting element, the deflecting element grips the paper web on one side and places it in the area of the second deflecting element.

Advantageous embodiments of the invention provide that the first deflecting element is arranged at a free end of an actuation rocker. The actuation rocker may have paper-guiding elements. Preferable, the actuation rocker is mounted so as to swivel in such a way that in the insertion position (position A) the paper elements of the actuation rocker, together with further paper-guiding elements of the paper-transport device, form an insertion channel for the paper web.

The deflecting elements of one embodiment are constructed as paper rollers. Another feature of the invention is an actuation handle on the actuation rocker with an assigned locking device for the operational position (position B).

Opposite the first deflecting element, a paper-guiding element is arranged at a distance to form a passage for the paper web.

The paper-guiding element preferably forms part of a collecting tray.

With the paper-separating device according to the invention, the continuous paper can be inserted particularly easily into the printer. For this purpose, the first deflecting element which is arranged at the free end of an actuation rocker is swivelled by means of the actuation rocker and the paper is easily inserted into the paper channel which becomes free. When swivelling up the actuation rocker, the paper is gripped and brought into the region of the second deflecting element. The paper is thus carried completely through the paper-separating device and inserted in an operationally reliable manner into the printer.

In an advantageous embodiment according to the invention, the actuation rocker itself has paper-guiding elements which, together with further paper elements of the printer, form an insertion channel for the paper web. An ergonomically optimum insertion aid is thus present which substantially facilitates the insertion of the paper web into the printer.

BRIEF DESCRIPTION OF THE PREFERRED EMBODIMENTS

The embodiment of the invention is illustrated in the drawings and described in greater detail by way of example below.

DETAILED DESCRIPTION OF THE PREFERRED EMBODIMENTS

Figure 1:
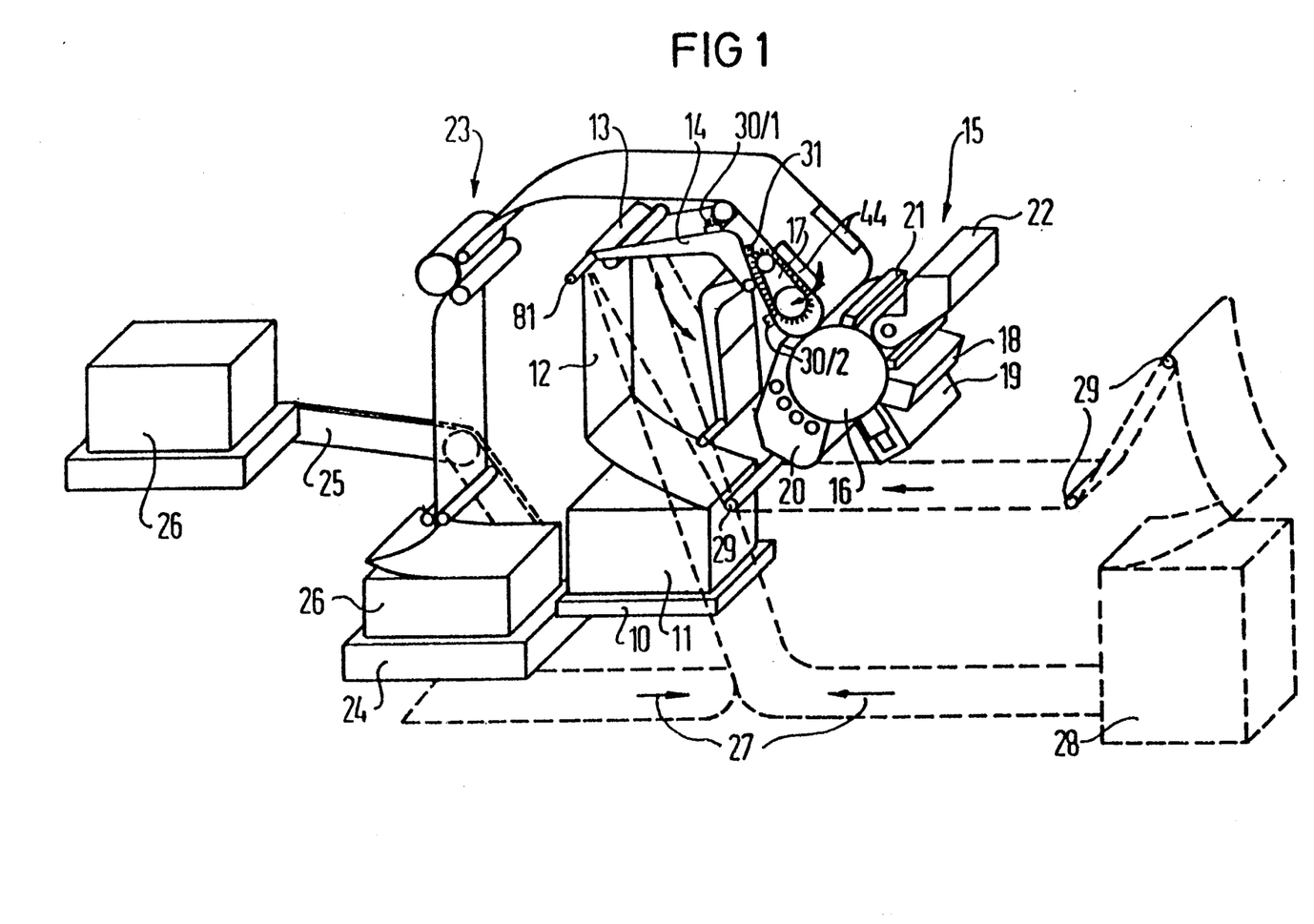
FIG. 1 shows a diagrammatic illustration of an electrophotographic printer.

A printer operating according to the principle of electrophotography has a stock table 10 for receiving a stockpile 11 of prefolded continuous paper 12. The continuous paper is fed via a paper-separating device 13 and a swivelling actuation rocker 14 provided with paper-guiding elements to the actual electrophotographic printer unit 15. This printer unit 15 has a transfer station 17 which can be swivelled towards and away from a photoconductive drum 16, as well as devices arranged around the photoconductive drum 16 which are necessary for the electrophotographic process.

In order to produce a toner image on the continuous paper, the photoconductive drum 16 charged by means of a charging device 18 is discharged character-dependently in the usual manner by means of an LED character generator 19 and the charge image produced in this way is inked in a developer station 20 with a developer mixture of toner particles and carrier particles. The toner image is then transferred onto the continuous paper 12 in the transfer station 17. After the transfer, the photoconductive drum 16 is discharged via a discharge station 21 and cleaned in a cleaning station 22 and charged again by means of the charging device 18.

Instead of the electrophotographic process described, it is also possible, for example, to use an electrostatic process or a magnetic process or even an inking comb which applies ink directly to the continuous paper in order to produce the toner image from the continuous paper 12.

The paper web 12 provided with a toner image is then fixed in a fixing station 23 chemically or by means of heat and stacked on a stacking table 24. In the illustrated exemplary embodiment of the printer, the stacking table 24 is designed to swivel out by means of a swivel lever 25 in order to facilitate the removal of the printed paper stack 26.

If the printer is coupled, for example, to a further printer in order, for example to permit printing on the front or rear, the paper web 12 can also be fed directly via external paper-feed channels 27 to the paper-separating device 13. It is also possible to use an external listing stockpile 28 as the stockpile. Separate paper-feed elements with paper rollers 29 may also be necessary for feeding the paper web.

In order to prevent the penetration of particles such as paper clips or other metal parts which damage the photoconductive drum 16 into the printer unit 15, a particle trap 30/1, 30/2 is arranged either at the input area to the transfer station 17 or integrated in the transfer station. The printer also has a paper-insertion device, which can be activated by means of the actuation rocker 14, with associated paper brake 31.

Figure 2:
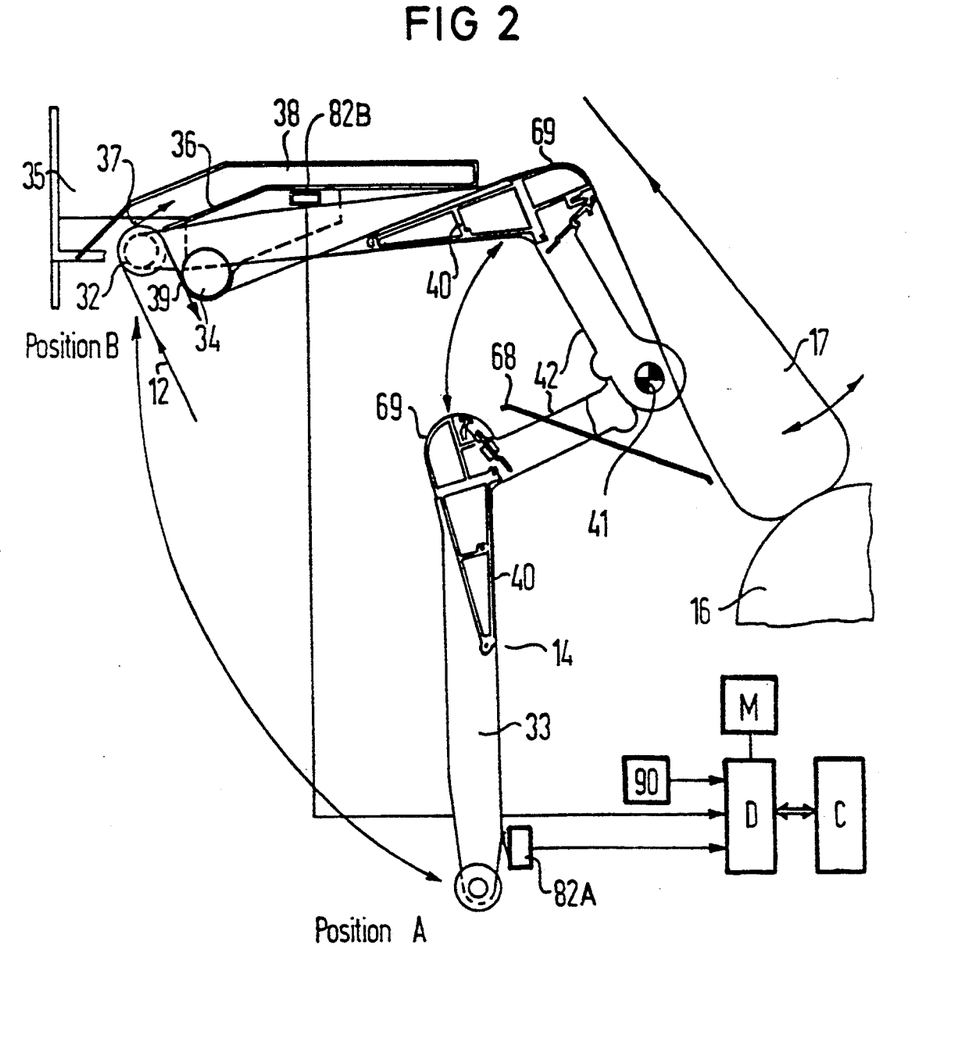
FIG. 2 shows a paper-separating device in the operational position (position B) and in the swivelled position (position A)

The aforesaid devices of the printer are now described in detail:

Paper-separating Device (FIG. 2)

In order to be able to separate from one another paper layers, which are stuck to one another, of the continuous paper web 12 drawn off the stack 11, a paper-separating device 13 is arranged at the entry of the feed channel to the printer unit 15, above the paper stack 11. This paper-separating device contains a first deflecting element in the form of a rotatably mounted paper roller 32 which is arranged between two side parts 33 of the actuation rocker 14 on its free swivel ends. Furthermore, it contains a second deflecting element in the form of a motor-driven paper roller 34 which is arranged fixedly on two carrier elements 35 which are permanently connected to the housing of the printer. The motor-driven paper roller 34 is located in the swivel area of the actuation rocker 14. Above the first deflecting element (paper roller 32), a paper-guiding element 36 is arranged at a distance forming a passage for the paper web. The paper-guiding element 36 is constructed in such a way that it forms, together with other sheet metal elements, a collecting tray 38 for the first separated-off folded sheet of the paper web.

In the operational position (position B), i.e. with the actuation rocker 14 swivelled up, the continuous paper web 12 is initially guided in a first deflection direction by means of the first deflecting element 32. A first paper layer 37 which, with respect to the paper roller 32, adheres to the outside of the paper web is separated off by its folding edge from the paper-guiding element 36 and penetrates the collecting tray 38. During further transport, the first paper layer 37 is fanned out. A second paper layer which, with respect to the paper roller 32, adheres to the inside is carried by the paper web 12 around the paper roller 32 with the first deflecting direction and is then released from the second deflecting element (paper roller 34) by the deflection at said element and drops down. This also leads to a fanning out of the paper layer so that a separated-out, unfolded continuous paper web 12 is available for further transport via a paper-guiding element 40 arranged between the side parts 33 of the actuation rocker 14.

Figure 3:
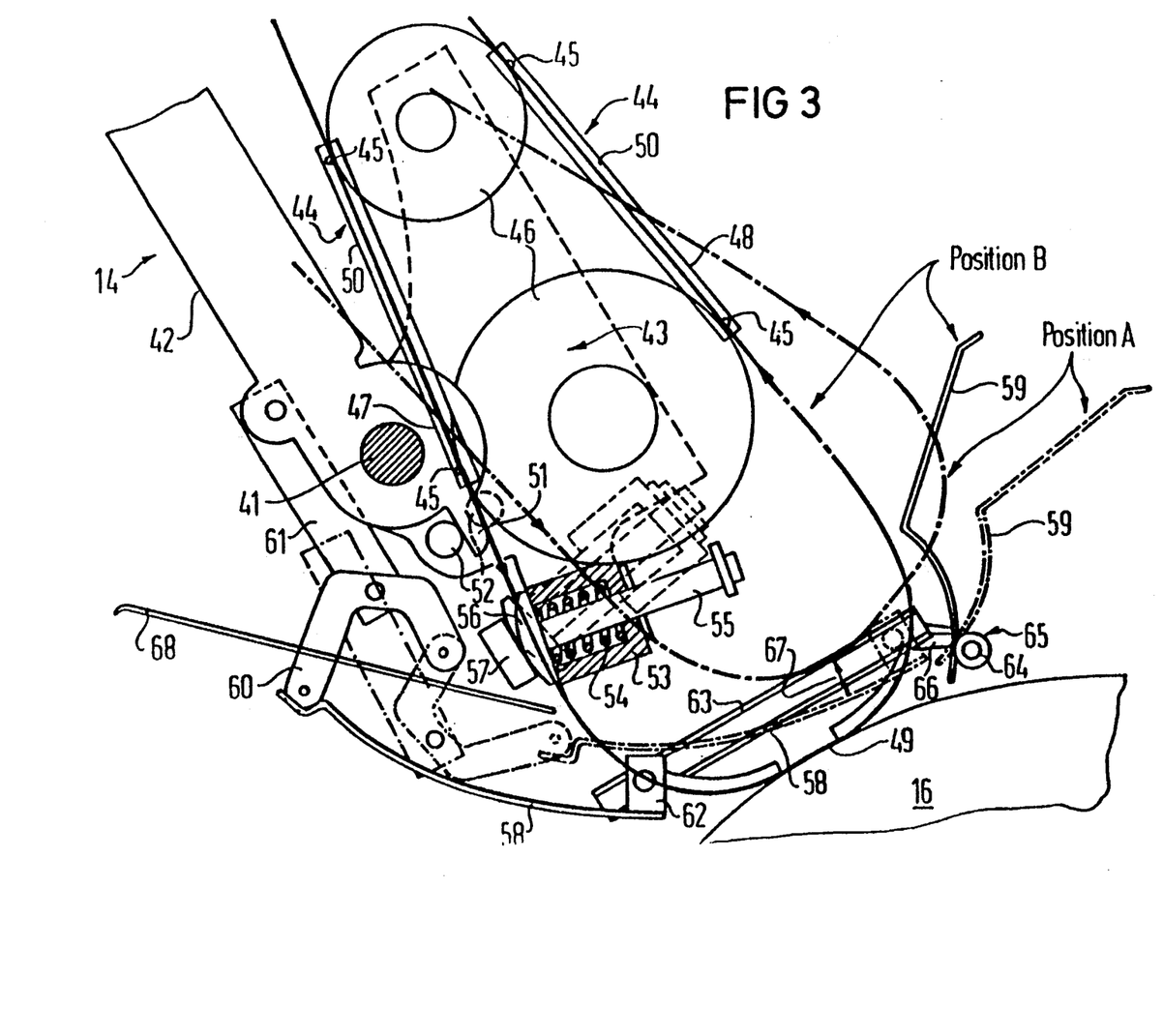
FIG. 3 shows a diagrammatic illustration of a portion of the paper-insertion device in the region of the transfer station.

Paper-insertion Device (FIGS. 2, 3)

The actuation rocker 14 thus only forms a component of a paper-separating device 13 but is also an essential functional element of a paper-insertion device for the insertion of the continuous paper 12 into the printer. In order to permit the insertion of the continuous paper, the actuation rocker 14 is coupled mechanically to the transfer station 17 in such a way that when the actuation rocker 14 swivels out of a loading position A into an operating position B, the transfer station 17 is swivelled towards the photoconductive drum 16 or swivelled away when swivelling from position B into position A.

For this purpose, the actuation rocker 14 is rotatably mounted in the area of the transfer station on axle 41, fixed to the frame, by means of retaining elements 42. The transfer station itself is also swivellably mounted on the axle 41, which is fixed to the frame, by means of a cast carrier 43 which is only illustrated here diagrammatically. The transfer station contains a traction drive with two traction belts 44 having transport pins 45 arranged thereon, said transport belts engaging laterally in the edge perforations of the continuous paper 12. The traction belts 44 are guided and mounted on two drive wheel pairs 46 which are connected to one another via axles, the drive of the traction elements occurring by means of a motor M (FIG. 2) which is coupled to the large pair of drive wheels. When transporting the continuous paper 12, the continuous paper engages with the traction belts 44 by means of its perforation holes 9, viewed in the direction of transport of the paper, before 47 and also after 48 the transfer area 49 of the transfer station. Four transport flaps 50 which press the continuous paper against the traction belts 44 in the area of the perforation holes 9 are provided as securing and guiding elements for the continuous paper.

The transfer station 17 is moved by means of an entrainer, or dog, 51 which is arranged in the bearing area of the actuation rocker 14 and cooperates with a stop pin 52 on the cast carrier 43 (frame) of the transfer station 17. Mounted on the cast carrier 43 is a sheath 53 with a spring 54 arranged therein and a spring bolt 55 guided in the sheath 53. The spring bolt 55 rests with its head 56 on a stop 57, which is fixed to the frame, and rolls against the latter during the movement of the transfer station. The swivelling towards and away from the transfer station thus occurs with or counter to the spring force of the spring 54. When swivelling the actuation rocker 14 from the position B to the position A, the spring bolt 55 supports the swivelling movement of the transfer station, the stop pin 52 resting against the entrainer 51 up to a specific swivel angle. In this case, the swivel angle of the transfer station is limited by the length of the spring bolt 55 with a stop arranged thereon.

So as not to smudge the toner image on the paper web when swivelling away from the transfer station with an inserted paper web, the transfer station 17 is mounted with respect to its pivot, in such a way that the paper guided in the transfer area 49 via the transfer station 17 immediately lifts off from the photoconductive drum without dragging there.

In order to protect the photoconductive drum 16 in the swivelled state of the transfer station and to be able to form a widened paper channel, in particular for the insertion of the continuous paper 12, swivelling paper-guiding elements 58 and 59 are arranged in the area of the transfer station. The paper-guiding element 58 is linked via a toggle lever 60 to a guiding element 61 mounted on the actuation rocker 14, one end of the paper-guiding element 58 being guided via a slide pin 62 in a rail 63 which is fixed to the frame.

The paper-guiding element 59 which is arranged downstream of the transfer area 49 is in turn mounted, fixed to the frame, in a swivellable manner by means of a bearing 64. The said element has in the area of the bearing 64 a spring 65 which presses the paper-guiding element 59 into the illustrated closed position B. The paper-guiding element 59 is also connected to a projection 66 which cooperates with the slide pin 62. The slide pin 62 is located in the swivel area of the projection 66 and presses the paper-guiding plate 59 outwards in position A. In an embodiment (not illustrated here), the paper-guiding element 59 is supported on a knob of the transfer station 17 under the effect of the spring 65 and is swivelled by means of this knob.

In the operational position (position B) with swivelled-up actuation rocker 14 the transfer station 17 is swivelled towards the photoconductive 16 and the paper-guiding elements 58 and 59 release the transfer area 49. If the actuation rocker 14 is swivelled in the position A, the paper-guiding plate 58 on the rail 63 is guided into the area between photoconductive drum and transfer station and a widened paper-guiding channel 67 opens between transfer station 17 and paper element 58. The paper-guiding element 58 protects the photoconductive drum 16 in the transfer area 49 from the ingress of light and from damage. The paper-guiding channel 67 is continued in the paper-transport direction by the swivelled paper-guiding element 59, the paper-guiding elements 58, 59 overlapping partially.

In the paper-transport direction, a paper insertion plate 68 is permanently arranged upstream of the paper-guiding elements 58, 59, which plate cooperates with a round paper-guiding area 69 of the actuation rocker 14. The paper-guiding area 69 serves as a paper-deflecting element for the paper web.

In position A of the actuation rocker 14, the continuous paper 12 can now be guided without difficulty through the paper-guiding channel 67 via the paper-guiding area 69, the paper-insertion plate 68 and the paper-guiding elements 58 and 59 around the transfer station and inserted into the output-side traction belt 48.

Figure 4:
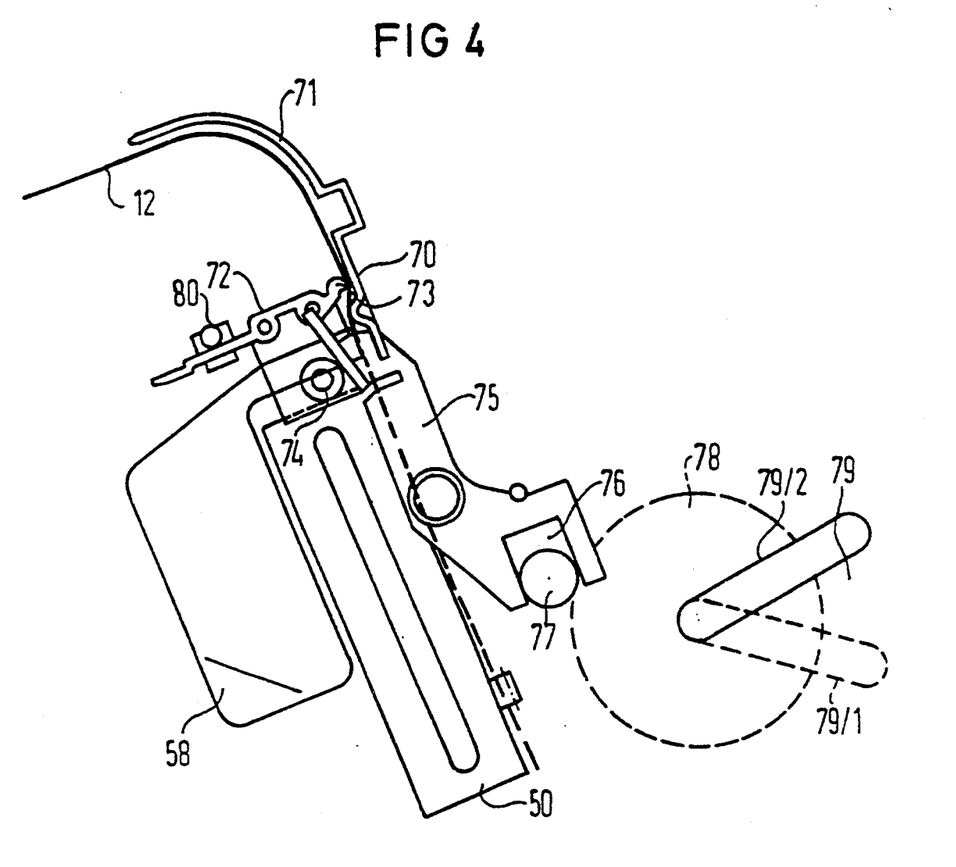
FIG. 4 shows a diagrammatic illustration of a paper brake in the activated state with the traction flaps open.
Figure 5:
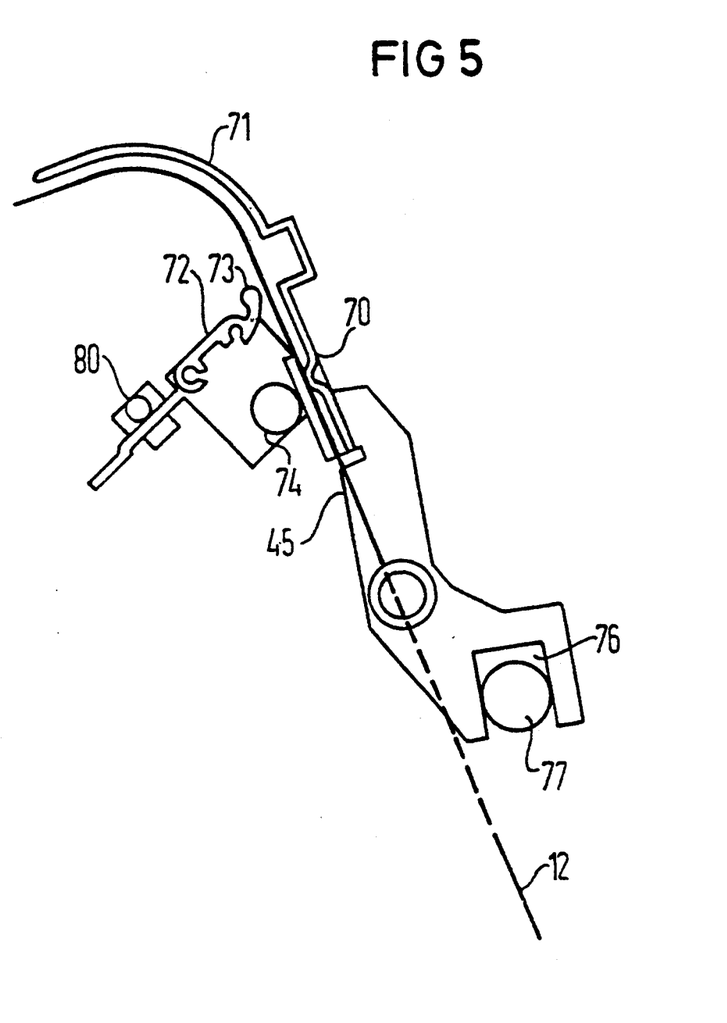
FIG. 5 shows a diagrammatic illustration of the paper brake in the deactivated state with the traction flaps closed.

Paper Brake (FIGS. 4, 5)

A paper brake 31 (FIG. 1) is arranged in the intake area of the paper-guiding channel for the transfer station 17. This paper brake contains a deflecting element 70 in the form of a rib plate which is mounted on the transfer station at the entry of the transfer station 17 and is a component of a continuous deflecting plate 71. The deflecting element 70 cooperates with a corresponding element 72 which can be swivelled backwards and forwards and is arranged in the paper-guiding area 69 on the actuation rocker 14. The corresponding element 72 has a brake projection 73 and a stop pin 74 which cooperates with an actuation lever 75 mounted on the transfer station 17. The actuation lever 75 is in turn coupled via a recess 76 to a pin 77 which cooperates by means of a gearing 78 with a switching lever 79 to close the traction flaps 50 of the feed area of the transfer station. The switching lever 79 is also coupled via the gearing 78 and corresponding locking projections (not illustrated here) to the traction flaps 50. In the operating state, the traction flaps 50 rest on the paper web under the effect of pressure springs (not illustrated here) arranged in the hinge area of the traction flaps. If they are swivelled away, this occurs counter to the effect of these pressure springs, in which case the traction flaps 50 remain in the opened state after overcoming a dead center of the springs.

With the traction flap 50 opened, the switching lever 79 is in the position 79/1. The actuation lever 75 is in the swivelled-out position via the pin 77 and presses the corresponding element 72 with the brake projection 73 into the operating position. The actuation rocker 14 is located in the position B, i.e. in the swivelled-up position. The paper brake is thus activated and the continuous paper 12 is deflected and thus braked between the brake projection 73 and the rib plate. The brake projection 73 is a component of the corresponding element 72 which consists of a profile piece extending over the width of the continuous paper 12.

In order to close the two traction flaps 50 arranged in the input area of the transfer station, the switching lever 79 is placed in the position 79/2 as a result of which the flaps 50 swivel by means of the gearing 78 via the dead center of their springs and the springs close the flaps. At the same time, the actuation lever 75 is swivelled back via the pin 77 and, under the effect of a spring 80 arranged on the pivot of the corresponding element 72, swivels back the corresponding element 72 with the brake projection 73 and disengages from the continuous paper 12 and releases the latter. During the printing operation, the continuous paper 12 can now be guided freely by the paper brake 31 without a braking effect.

Figure 10:
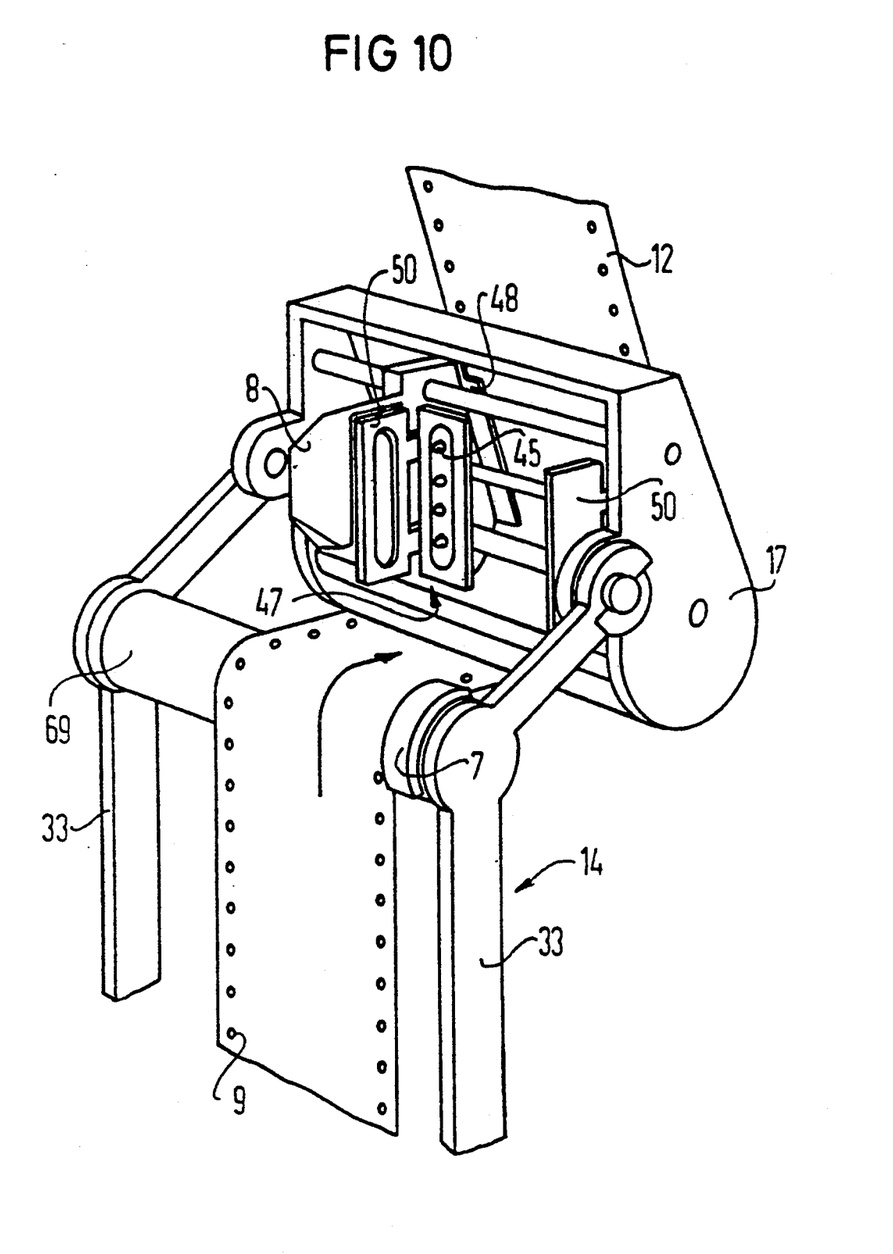

The entire paper-insertion device functions as follows:

After the insertion of the paper stack 11 on the stock table 12, the actuation rocker 14 is swivelled via a handle 81 into position A. This position A is sensed via a switch 82A (FIG. 2). The transfer station 17 is swivelled and the paper-guiding elements 58 and 59 cover the photoconductive drum 16 and open a wide paper-insertion channel 67. The paper can be carried through the printing station via this paper-insertion channel and suspended in the output-side traction belts 48. After this, the transport flaps 50 of the output-side traction belts 48 are closed. If the transport flaps 50 of the traction belts 47 arranged in the paper intake area of the transfer station 17 are to be closed, they are opened. As a result, the switching lever of the flap actuator 79 is in position 79/2. The actuation lever 75 of the paper brake is swivelled out. This position is illustrated in FIG. 10.

In order to be able to feed in with correct positioning into the transport pins 45 of the traction belts 47 upstream of the transfer station 17, the continuous paper 12 must be width-centered before the loading rocker 14 closes. This means the paper web 12 must be aligned on the actuation rocker 14 in such a way that the perforation holes 9 of the continuous paper 12 are flush with the input-side traction belts 47. This is by no means self-evident since, of course, depending on the position of the stack 11 the paper web 12 may be situated too far forwards or too far backwards on the stock table. In order to achieve this centering, a centering device is arranged in the input area of the transfer station. It contains an angled-off sheet metal tab 8 which is coupled in a width-displaceable manner to the input-side traction drive 47. The tab serves as a centering funnel, viewed in the direction of transport of the continuous paper 12, for the continuous paper and can be matched, together with the traction drive 47, to the width of the continuous paper 12. In addition, a permanent, right-hand guide stop 7 for the continuous paper 12 is arranged on the deflecting area 69 of the actuation rocker 14.

If the actuation rocker 14 is closed, a rough centering first occurs by means of the right-hand front stop 7 during operation at an extra slow speed of the continuous paper 12. In the course of the folding up of the loading rocker 14, the paper web moves into the capture range of the rear centering, namely the capture range of the sheet metal tab 8. With the aid of the slowly running paper drive, the continuous paper web 12 becomes centered between the front permanent stop 7 and the rear stop 8 so that the perforation holes 9 are flush with the traction belts 47.

The actual feeding in of the perforation holes 9 into the transport pins 45 then occurs.

As described, already during the swivelling of the actuation rocker 14 in the direction of operational position B the traction drive was activated at extra slow speed by means of a timer which, for example, can be arranged in the printer control C, D. This timer can be constructed, for example, as a counter.

During the swivelling up, the paper-guiding element 58 is first swivelled out of the transfer area 49 via the toggle lever 60 and the guiding element 61. If the actuation rocker 14 is then brought further in the direction of position B, the centering device, as described, begins to operate and the entrainer 51 comes into contact with the stop pin 52 and thus moves the transfer station 17 completely in its operational position (position B, FIG. 3). Shortly before a lock mounted on the actuation rocker 14 closes in position B, the paper brake is activated.

The output-side traction belts 44 now draw the continuous paper against the effect of the paper brake 31 until it is tensioned tautly about the transfer station 17. As a result, the transport nipples 45 of the traction belts 47 arranged on the input side engage with the perforation holes 9 of the continuous paper 12.

If the actuation rocker 14 is closed, this position is sensed via a further switch 82B and reported to the drive control D. The paper web is now guided through the paper-separating device 16.

After the end of the extra slow speed phase, the transport flaps 50 are closed via the switching lever 79. The paper brake 31 is deactivated in the manner described and the continuous paper 12 released. The paper is thus completely inserted in the transfer area and can now be automatically fed through to the fixing station 73 or to the stacking table 24 by further transport.

Instead of the semi-automatic feeding through, it is also possible to achieve a fully automatic feeding through by actuating the switching lever 79 by means of a solenoid. This solenoid can be arranged in the area of the gearing 78 and is connected to the control of the printer and to the switches 82A and 82B.

The solenoid can be connected in such a way that it automatically closes after the end of the extra slow phase when the paper web 12 is fed into the transport flaps 50.

The opening of the insertion device with the inserted paper web occurs in the reverse order. Initially, the switching lever 79 is placed in the position with the flap at 79/2 and the paper brake 31 is thus activated. The transport flaps 50 arranged in the input area of the transfer station 17 are then opened and the actuation rocker 14 swivelled by means of the handle 81 (FIG. 1) after the lock is released. The paper-guiding channel 67 thus opens, the transfer station is swivelled and the transport flaps 50 arranged in the output area of the transfer station can be opened.

By means of the arrangement of a solenoid, this process can also be automated, in the locking of the transport flaps 50 being released and the paper brake 31 being activated when the printer stops. The transport flaps 50 arranged in the input area 47 of the transfer station 17 are then opened, the actuation rocker 14 swivelled and the transport flaps 50 arranged in the output area 48 of the transfer station are opened.

Instead of the mechanical paper brake which is divided in two, it is also possible to dispose a paper brake operating with underpressure, in which brake the continuous paper is sucked against a suction plate and thus braked.

In the case of the paper brake which is divided in two having a deflecting element 71 consisting of a sheet metal rib and having a corresponding element 72 arranged on the actuation rocker 14, the braking effect is automatically matched to the paper thickness of the continuous paper 12 used. Thus, in the case of thin paper, the braking force must not be too great in order, for example, not to tear the paper or to stretch it. By means of the lesser paper thickness, the paper is deflected less in the paper brake and thus experiences a smaller braking force. Thicker paper is deflected more strongly and accordingly braked more strongly.

In the case of paper brakes actuated with underpressure, a separate adaption of the underpressure to the paper thickness or paper weight is necessary for this purpose.

The braking force of a paper brake provided with deflecting elements, whether designed as one piece or two pieces, depends strongly on the deflecting radius on the deflecting element 70 and on the corresponding element 72 and can be set by means of the radii. The basic dimensions of the paper brake depend, inter alia, on the type of recording carrier used and the type of transport means and the drive in the transfer station.

Figure 6:
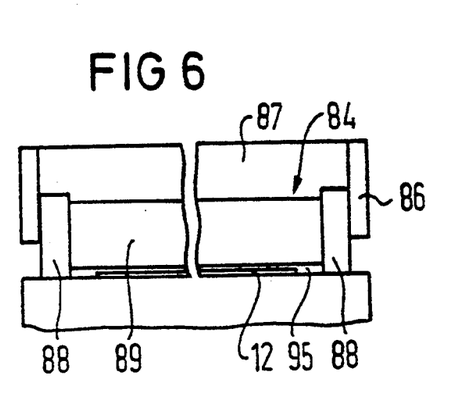
FIG. 6 shows a diagrammatic front view of a particle trap.
Figure 7:
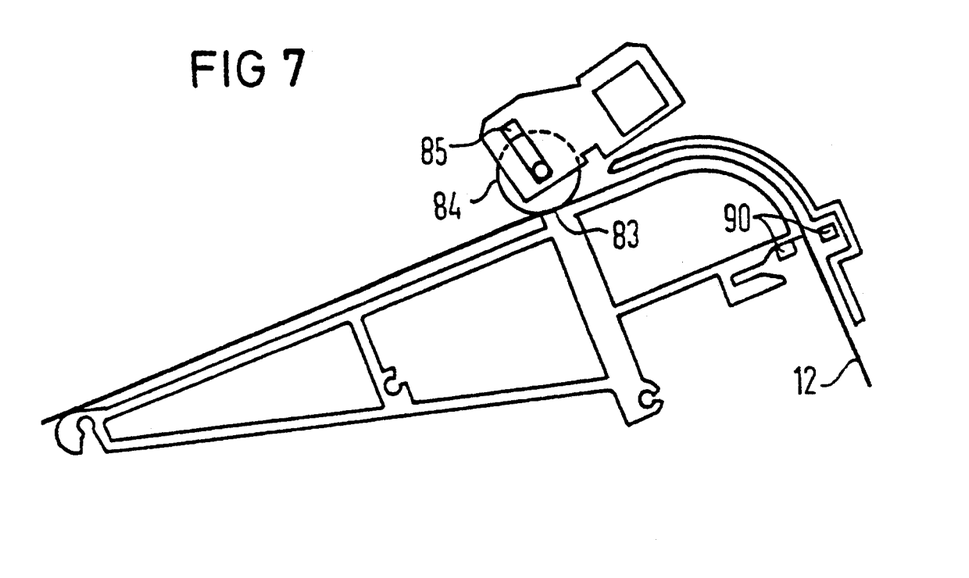
FIG. 7 shows a diagrammatic side view of a particle trap in the input area of the paper-guiding channel.

Particle Trap (FIGS. 6, 7)

As stated at the beginning, there is a particle trap situated in the input area of the transfer station 17 which serves for preventing the ingress of metal elements such as paper clips or the like into the area of the transfer station. Metal elements of this kind would lead to damage to the photoconductive. For this purpose, a round metal rod 84 is guided in slots 85 of a bracket by means of a paper bracket of the actuation rocker 14 shortly upstream of the deflecting area 69. The bracket consists of a crossbar 87 which is mounted on the housing of the printer with lateral retaining tabs 86. The metal rod 84 in turn has two lateral, round guide areas 88 of large diameter and a capture area 89, extending transversely over the paper web, with a smaller diameter. As a result, a passage slot for the paper 12 is produced between the paper bracket 83 and the crossbar 87 in the capture area 89.

A metal object which penetrates the paper slot becomes wedged in the passage slot 95 and leads to a tear in the paper web. This tearing of the paper web 12 is detected by means of corresponding detectors, for example in the form of a light barrier 90 arranged in the deflecting area 69 and the paper-transport is stopped. In order to remove the particle the crossbar 87 can be moved upwards in the slots 85 of the lateral bracket 86. The bracket 86 with the slots 85 is arranged by means of the crossbar 87 at such an angle with respect to the paper web that the wedging effect is promoted in the event of penetration of metal particles. This is to be understood as meaning that wedging of the metal piece to be intercepted with subsequent paper tearing reliably occurs, on the other hand however it is ensured that the metal piece can easily be removed again by raising the metal rod 84.

Figure 8:
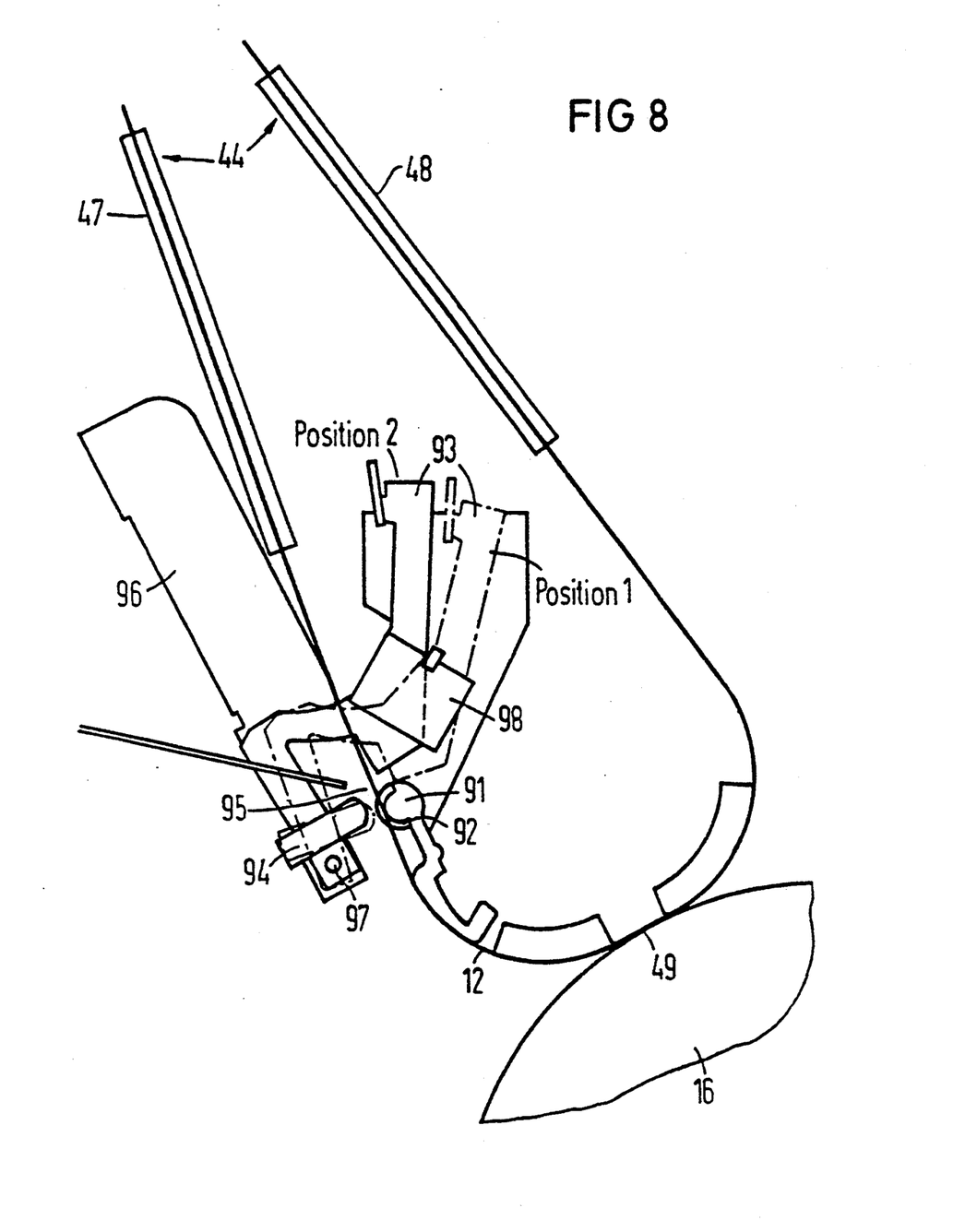
FIG. 8 shows a diagrammatic sectional view of the transfer station with integrated particle trap.
Figure 9:
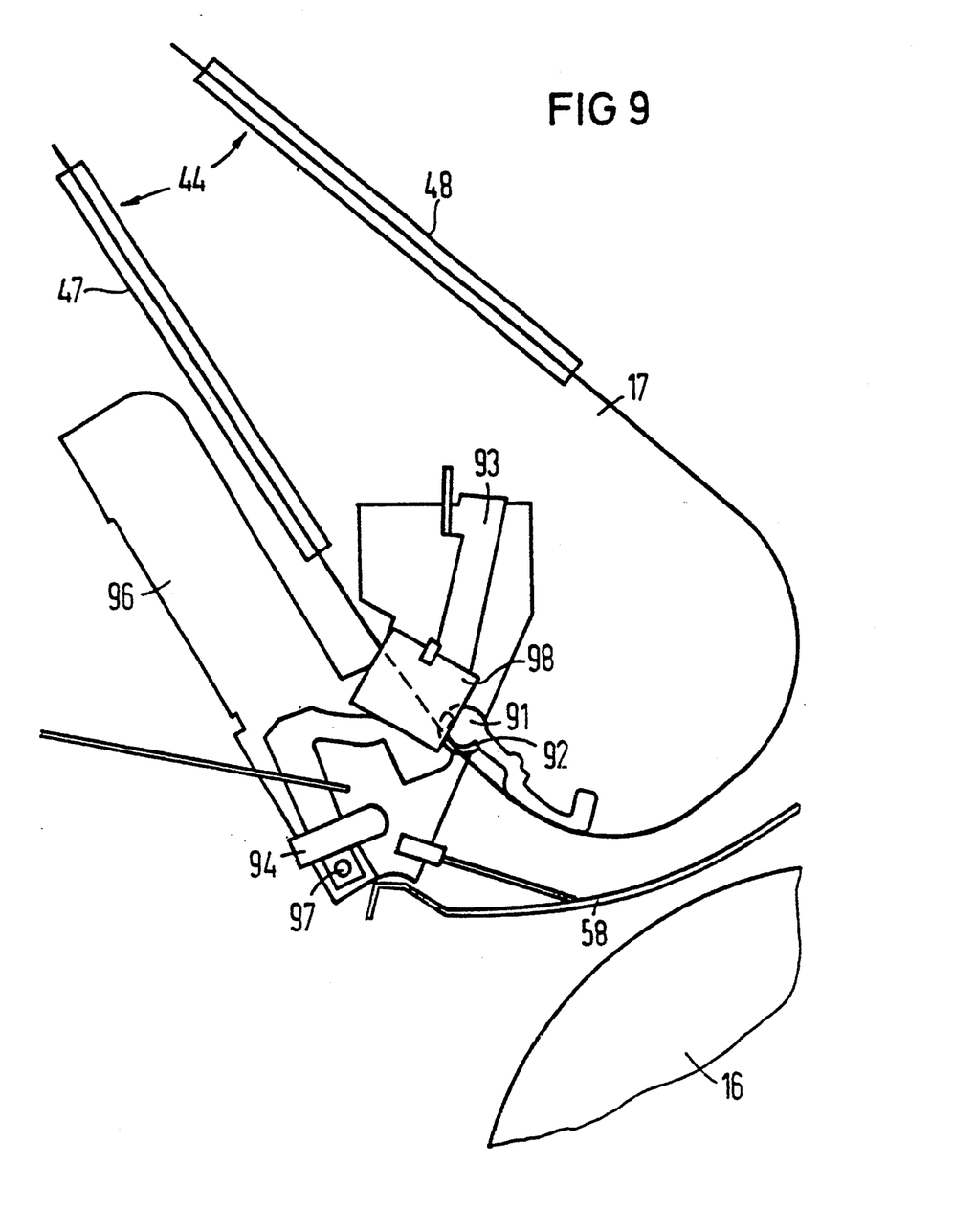
FIG. 9 shows a diagrammatic sectional view of the transfer station with opened particle trap and FIG. 10 shows a diagrammatic illustration of a paper-centering device in the input area of the transfer station.

In a preferred exemplary embodiment of the particle trap according to FIGS. 8 and 9, the particle trap is arranged on the transfer station 17 between the input-side and output-side paper traction elements 47, 48 in the paper-transport device upstream of the transfer point 49. In this way, in the event of movement of the paper both in the forwards and backwards direction, the paper cannot become stuck in the passage slot of the particle trap since the paper is always clamped between the traction belts 47 and 48.

The particle trap itself contains a deflecting profile 91 which is arranged in the paper channel of the transfer station and extends over the width of the transfer station 17 and along which the continuous paper with its non-inked rear sides. Spacing plates 92 are mounted at the lateral ends on the deflecting profile 91. In this way, a structure for the deflecting profile 91 which corresponds to the metal rod 84 including the guide areas 88 of the exemplary embodiment in FIG. 2 is obtained.

A particle bar 94 in the form of a metal bar can be swivelled towards the deflecting profile by means of a lever 93, the particle bar 94 resting on the spacing plates 92 in the swivelled state and forming a passage slot 95 (calibration gap) between deflecting profile 91, with continuous paper 12 guided thereon, for the purpose of capturing particles.

The calibration gap 95 is funnel-shaped in cross-section in the paper intake area. It is thus ensured that the metal pieces to be captured with the subsequent paper are thus wedged.

The lever 93 is mounted on a bearing block 96 for the swivel bearing 41 of the actuation rocker 14 and, specifically, so as to swivel about a pivot 97. In addition, it has a locking device 98 which permits the lever 93 to lock in two positions. These locking positions are sensed via a microswitch 99. These locking positions are: a first position (position 1) in which the particle bar 94 is swivelled towards the deflecting profile 91 and the particle trap is thus closed and a second position (position 2) in which the particle bar 94 is swivelled from the deflecting profile 91. The swivelled position 2 is necessary if labels, arranged on the continuous paper 12, which considerably thicken the paper, are to be printed using the printer. If the particle trap were not swivelled, the labels would become stuck in the paper slot. The positions of the lever 93 are detected by means of a microswitch 99 and reported to the device control of the printer. The device control monitors the functional states of the particle trap.

In both lever positions 1 and 2 in FIG. 8, the transfer station 17 is in the operational position, i.e. it is swivelled towards the photoconductive drum 16 and the actuation rocker 14 is locked.

If a piece of metal becomes wedged in the calibration gap 95 (passage slot) in this operational position, the paper web 12 tears and this tear is detected by means of the light barrier 90 and the paper-transport is stopped. In order to remove the particles, the transfer station 17 is swivelled in accordance with FIG. 9 by means of the actuation rocker 14, the paper-guiding element 58 therefore swivels into the paper-transport channel and protects the photoconductive drum 16. Particles dropping from the calibration gap cannot damage the photoconductive drum 16.

The entire control of the feeding-in process and the monitoring of the individual elements of the paper-insertion device occurs by means of a customary microprocessor-controlled measurement monitoring device D (FIG. 2). This monitoring device D detects the switching states of the switches 82A and 82B, and of a light barrier 90 and controls the drive motors M of the transfer station 17. The monitoring device D is a component of the device control C which can be designed, for example, in accordance with U.S. Pat. No. 4,593,407.

Although other modifications and changes may be suggested by those skilled in the art, it is the intention of the investors to embody within the patent warranted hereon all changes and modifications as reasonably and properly come within the scope of their contribution to the art.

We claim:

1. A paper-separating device for prefolded continuous paper of a predetermined stiffness which is drawn from a stockpile by a paper-transport device and is fed to a printer, comprising:

means for guiding the paper web between the paper-transport device and the stockpile in a first deflecting direction via a first deflecting element, a deflection radius of said first deflection element being sufficiently small that folded paper layers of said predetermined stiffness which adhere together are fanned out and said guiding means guiding the paper web via a further, second deflecting element which deflects the paper web in a second deflecting direction, said second deflecting element being arranged downstream of the first deflecting element in a direction of paper-transport, the first deflecting element being swivellably mounted and the second deflecting element being stationarily mounted in a swivel area of the first deflecting element, and in an insertion position assigned to the swivelled position (position A) of the first deflecting element, the paper web can be inserted into the paper-transport device and, when the first deflecting element is swivelled into an operational position (position B) with swivelled-in first deflecting element, the deflecting element grips the paper web on one side and places it in the area of the second deflecting element; a paper-guiding element opposite said first deflecting element and receiving following folded paper layers of the pre-folded paper which had been stuck to preceding folded paper layer and which have been fanned out by passage over said first deflecting element.

* * * * *